Feb. 22, 1955    R. FORTUNE    2,702,686
DIAPHRAGM VALVE
Filed June 14, 1950    7 Sheets-Sheet 1

INVENTOR.
RONALD FORTUNE
BY Edward H. Lang
ATTORNEY

INVENTOR.
RONALD FORTUNE
BY Edward H. Lang
ATTORNEY

INVENTOR.
RONALD FORTUNE
BY Edward N. Lang
ATTORNEY

Feb. 22, 1955 R. FORTUNE 2,702,686
DIAPHRAGM VALVE
Filed June 14, 1950 7 Sheets-Sheet 4

INVENTOR.
RONALD FORTUNE
BY Edward H. Lang
ATTORNEY

INVENTOR.
RONALD FORTUNE
BY Edward H. Lang
ATTORNEY

United States Patent Office 2,702,686
Patented Feb. 22, 1955

2,702,686

DIAPHRAGM VALVE

Ronald Fortune, Hamilton, Ontario, Canada

Application June 14, 1950, Serial No. 168,075

5 Claims. (Cl. 251—335)

This invention relates to new and useful improvements in diaphragm valves employing a resilient diaphragm as a fluid sealing member between the body and bonnet, particularly for service in corrosive or otherwise destructive fluids, and more particularly relates to improvements in diaphragm valves having an independent valve member for controlling the flow.

The prior art has illustrated two general types of diaphragm valve construction.

The first of these is directed toward a valve structure employing a diaphragm which performs the dual purpose of sealing the body from the bonnet and also acts as a fluid-controlling member. In this type of construction, the central portion of the body takes the form of a weir in conjunction with which the diaphragm forms the flexible portion of an elliptical orifice. Control of the fluid orifice is regulated by the degree of inward, or outward, flexing of the diaphragm toward, or away from, the solid weir and complete closure necessitates direct contact of the inner surface of the diaphragm with the solid weir which is integral with the body.

This first type of valve has served its useful purpose in respect to the less destructive corrosive fluids encountered throughout chemical industry, wherein the degree of concentration and the temperature are within the resistant qualities of the rubber or other resilient compounds from which the diaphragm is made.

This first type of valve presents distinct disadvantages in that the inherent nature of design limits the diaphragm to construction of a resilient material which must be employed to effect closure when compressing the diaphragm between the solid body weir and the compressor bar attached to the screw stem. It is, therefore, apparent that this type of valve cannot be safely or economically employed in actual services wherein destructive fluids, either corrosive or high temperature, or a combination of both are encountered exceeding the limits of the resistant qualities of the resilient diaphragm material.

Moreover, when such valves are used in conjunction with sticky or adhesive solutions, squeezing of the diaphragm directly between two solid members, causes the diaphragm to adhere to the seat or weir. This condition causes the diaphragm to become distorted, or may even collapse it sufficiently inward to seriously restrict the flow through the elliptical orifice, causing the diaphragm to wear rapidly, impeding the flow and decreasing the efficiency of the valve.

In this type of valve, the use of plastic or elastomer substances, such as Teflon and Kel-F, highly resistant to corrosion, for the molded diaphragm is not practicable, as such substances lack the resilient characteristics necessary to maintain a leak-proof seat between the inner surface of the diaphragm and the solid wear of the valve body. Furthermore, the ratio of diaphragm thickness required to the free-flexing arc of diaphragm is such that the stiffness of recently developed inert plastics, capable of resistance to destructive corrosive fluids at elevated temperatures, will not permit continuous flexure and reflexure of the diaphragm through its central plane of movement. Moreover, the diaphragm cannot be employed in laminated or composite sheets to overcome the stiffness of such plastics, as the inherent valve construction fails to provide secure central attachment. Furthermore, vacuum or pulsating pressure will collapse the thin laminations and the separate layers will adhere to the weir seat and become rapidly destroyed in service.

The second type of valve also employs a resilient diaphragm which serves as a fluid seal between the body and bonnet and is fastened between a diaphragm supporting member or follower plate and a valve member or seating disk, the latter to control an orifice within the valve body. The valve member is concentrically interposed between said orifice and the inner surface of the diaphragm.

This second type of valve avoids some of the disadvantages referred to in the case of the first type, but possesses certain disadvantages, mainly its failure to provide protection of the diaphragm when subjected to destructive or corrosive fluids or elevated temperatures, or the combination of both.

In my prior U. S. applications, Serial No. 31,117, filed June 4, 1948, now Patent No. 2,638,306 of May 12, 1953; Serial No. 514,344, filed December 14, 1943, now abandoned; and Serial No. 787,541, filed November 22, 1947, now Patent No. 2,638,307 of May 12, 1953, I have disclosed a valve comparable to the second type embodying general improvements in construction and combination which largely offset the disadvantages of this second type of valve of the prior art, such as lack of diffusion of the fluid as it passes through the centrally located opened orifice and intermediate chamber of the body and consequent erosion of the interior of the valve, failure to provide adequate support to avoid diaphragm flutter or collapse, failure to limit the exposed free-flexing area of the diaphragm, and also failure to provide a positive and durable seal between the valve member, the diaphragm and the supporting follower plate and ram.

With the exception of mechanical counterbalancing means incorporated in my prior U. S. application Serial No. 787,541, the present invention incorporates the general improvements of my prior applications, and, in addition, embodies the improvements hereinafter set forth.

It is, therefore, an object of the invention to provide a diaphragm valve of the type having a separate valve member, capable of operating for longer periods of time without failure than valves now available.

It is another object of the present invention to provide a protecting shield for the resilient diaphragm in a diaphragm valve which acts as a sealing member only, and which cooperates with a valve member disposed between the diaphragm and the fluid control orifice.

It is a further object of the invention to provide a valve structure in which a diaphragm protecting shield is securely locked between the axis of the inner surface of the diaphragm and the upper surface of the valve member, providing an improved means for extending the useful life of the diaphragm and the combination of components cooperating therewith, whereby to operate in a more efficient manner than heretofore.

Another object of the present invention is to provide a universally coupled, yet simply detachable spindle, for a diaphragm valve, permitting rapid assembly or dismantling of follower-plate, diaphragm, shield and valve member, and a self-aligning efficient radial motion of the combination when traveling toward, or away from, the valve orifice or seat, thus to automatically adjust the seating of the valve member with the valve seat when closing the valve, and also to adjust the outer surface of the diaphragm in bearing contact with supporting vanes when the valve is open.

A further object of the present invention is to provide a diaphragm valve of the aforesaid type wherein the mating connections of the spindle and follower-plate hub, comprising the two jaw clutch components of the universal coupling, are designed to give greatly increased structural strength, thus to prevent failure when abnormal torque is applied to close the valve.

A still further object of the present invention is to provide a diaphragm valve of the aforesaid type wherein the spindle can be detached from, or attached to, the follower-plate hub without disturbing the sealed assembly combination of the follower-plate, diaphragm, shield and valve member, whereby the double union joint and adjacent surfaces of these units of the assembled combination are protected against damage.

Still another object of the invention is to provide means for coaxially fastening the diaphragm and shield between the adjacent members in a manner to obviate rotation of one part with respect to another during assembly thereof, thereby to avoid initial distortion and injurious skin flex to the diaphragm and possible injury to the shield.

The invention also embodies other improvements, all of which will be clearly understood by reference to the following detailed specifications when taken in conjunction with the accompanying drawings.

Figure 1:
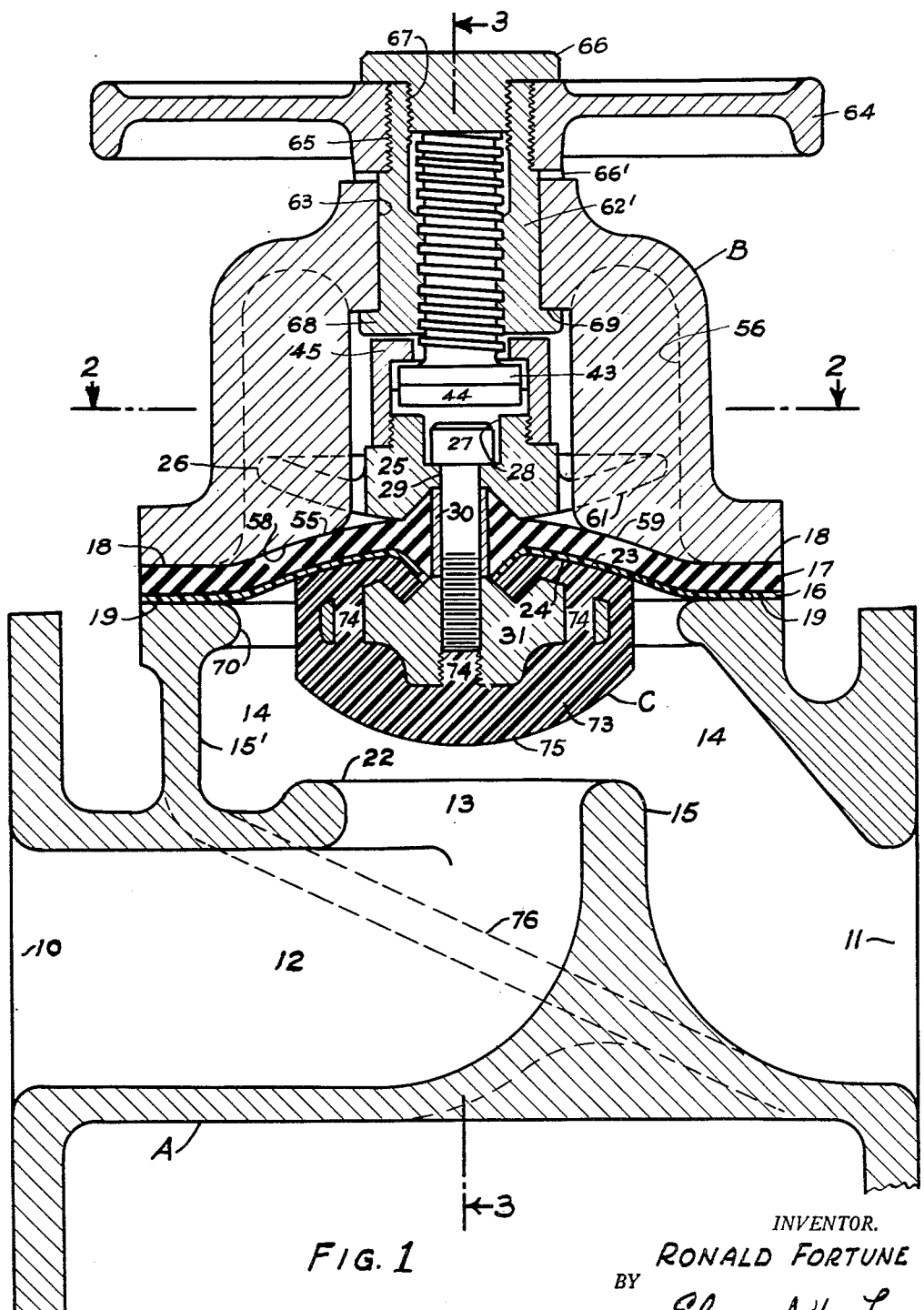
Figure 1 is a longitudinal section taken through the valve structure of the present invention, taken along the central longitudinal axis thereof, showing the valve in the open position with the protection shield and diaphragm locked between the upper surface of the valve member and the supporting vanes of the bonnet to prevent collapse or flutter of the shield and diaphragm.
Figure 2:
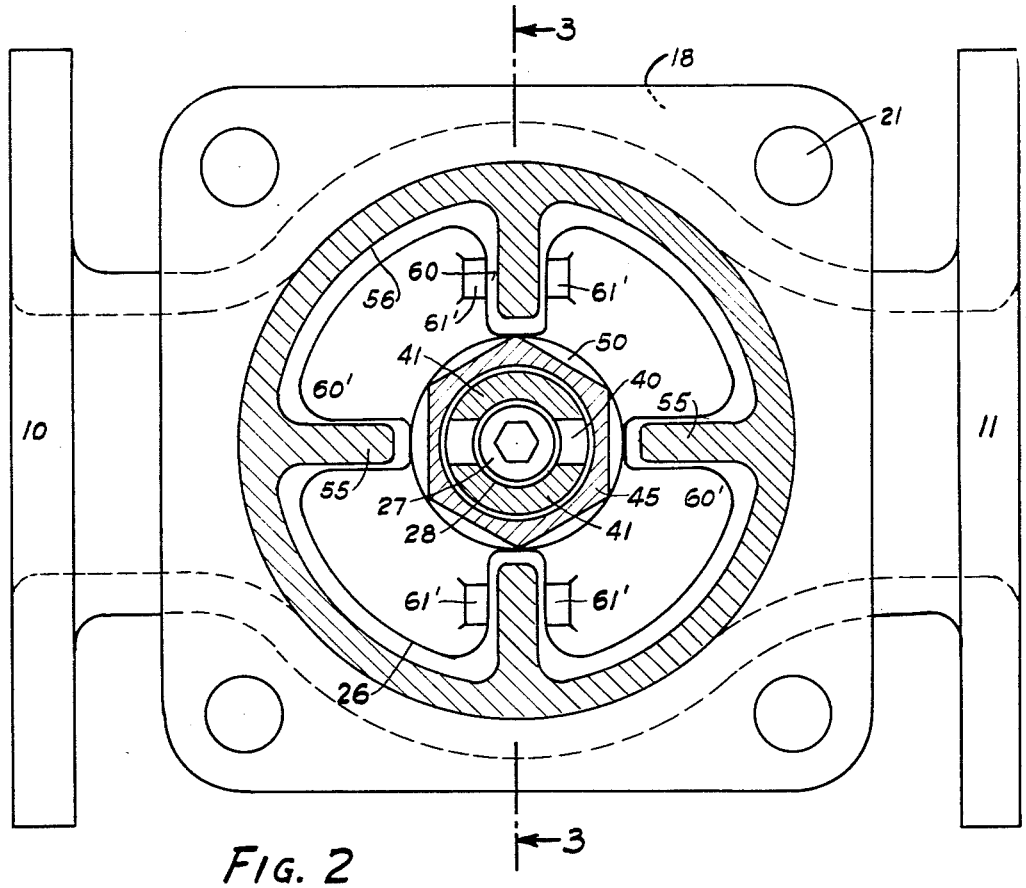
Figure 2 is a transverse section taken through the valve bonnet along the line 2—2 of Figure 1 showing the outer face of the follower plate with its female coupling hub.

Referring to the drawings and particularly to Figure 1, the letter A indicates a valve body having an inlet port 10 and an outlet port 11 and an intermediate tubular passageway 12 which terminates to form the centrally disposed orifice 13 between the inlet and outlet ports. A chamber 14 is formed in the valve body A and surrounds the nozzle 15 which encloses and defines the central orifice 13. The chamber 14 in turn is defined in part by the wall 15' and by the enclosing flexible protection shield 16 which operates, in conjunction with the reinforcing diaphragm 17, to isolate the bonnet B from the body A. Both the shield 16 and diaphragm 17 are clamped between the surfaces 18 and 19 of the body and bonnet respectively, the assemblage being held together by suitable bolts 20, which pass through holes 21 (Figure 2). It is important to point out the unique construction and combination wherein the resilient or flexible diaphragm 17 is employed mainly to provide structural backing to support the shield 16 during their operative coordination between the open and closed positions, and that the separate protective shield 16, molded to conform to the shape of the diaphragm, is employed specifically to render the sealing diaphragm immune to destructive fluids. Fluid control is effected by means of the valve member C, the latter being mounted coaxially inward of the protective shield 16, centrally of the orifice 13, and being designed to move towards or away from the valve seat 22.

The valve member C has an upper convex surface 23 designed to mate with the inner surface 24 of the shield 16 when the valve is in the open position.

The valve member C in a preferred construction is mounted from the hub 25 of the moveable follower plate 26 by means of the screw 27, the head of which is retained in the counterbore 28 of the hub 25. The body of the screw in turn passes through the central bore 29 of the hub, projects through the compression-limiting sleeve 30 and enters into threaded engagement with the core 31 of valve member C. The details of this construction are more clearly shown in Figures 5 and 6.

Figure 5:
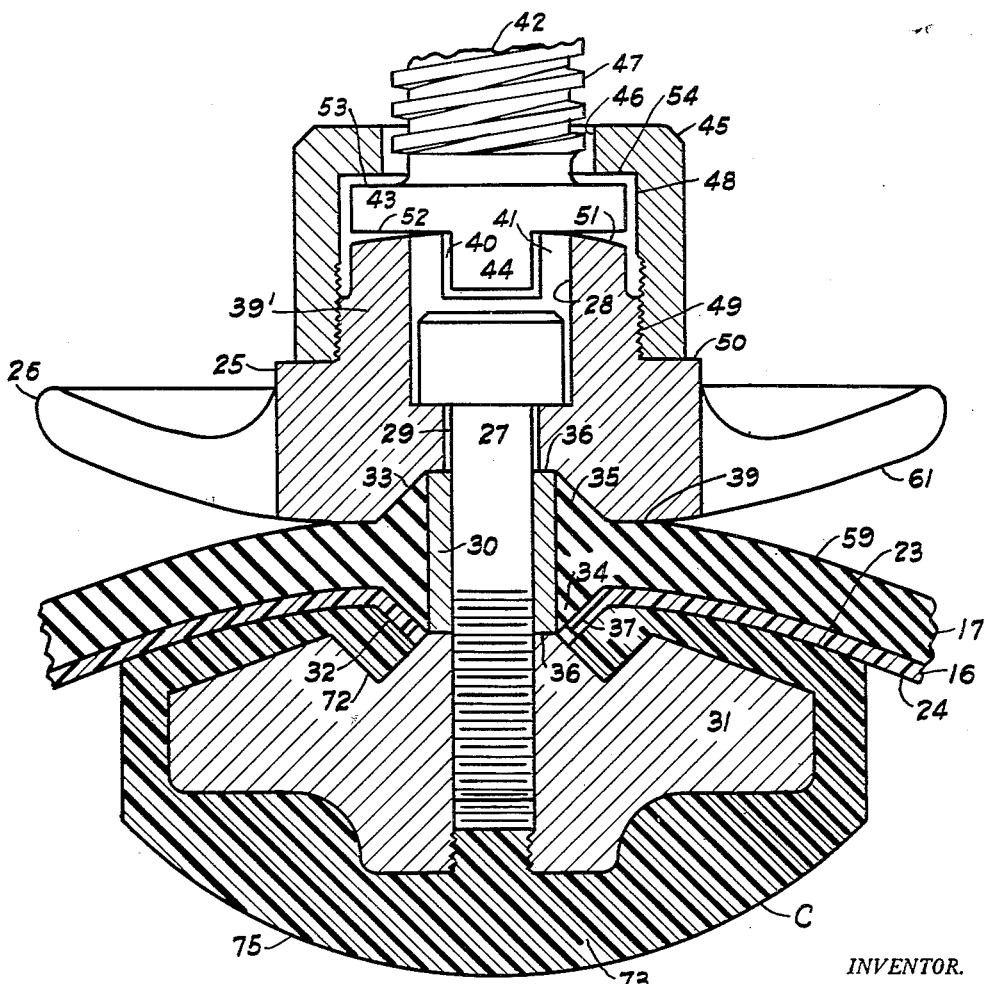
Figure 5 is an enlarged, longitudinal, fragmentary cross-section of the movable components to show more clearly the method of anchoring the protective shield into the lower joint of the coaxial union and to show the construction of the universal coupling.
Figure 6:
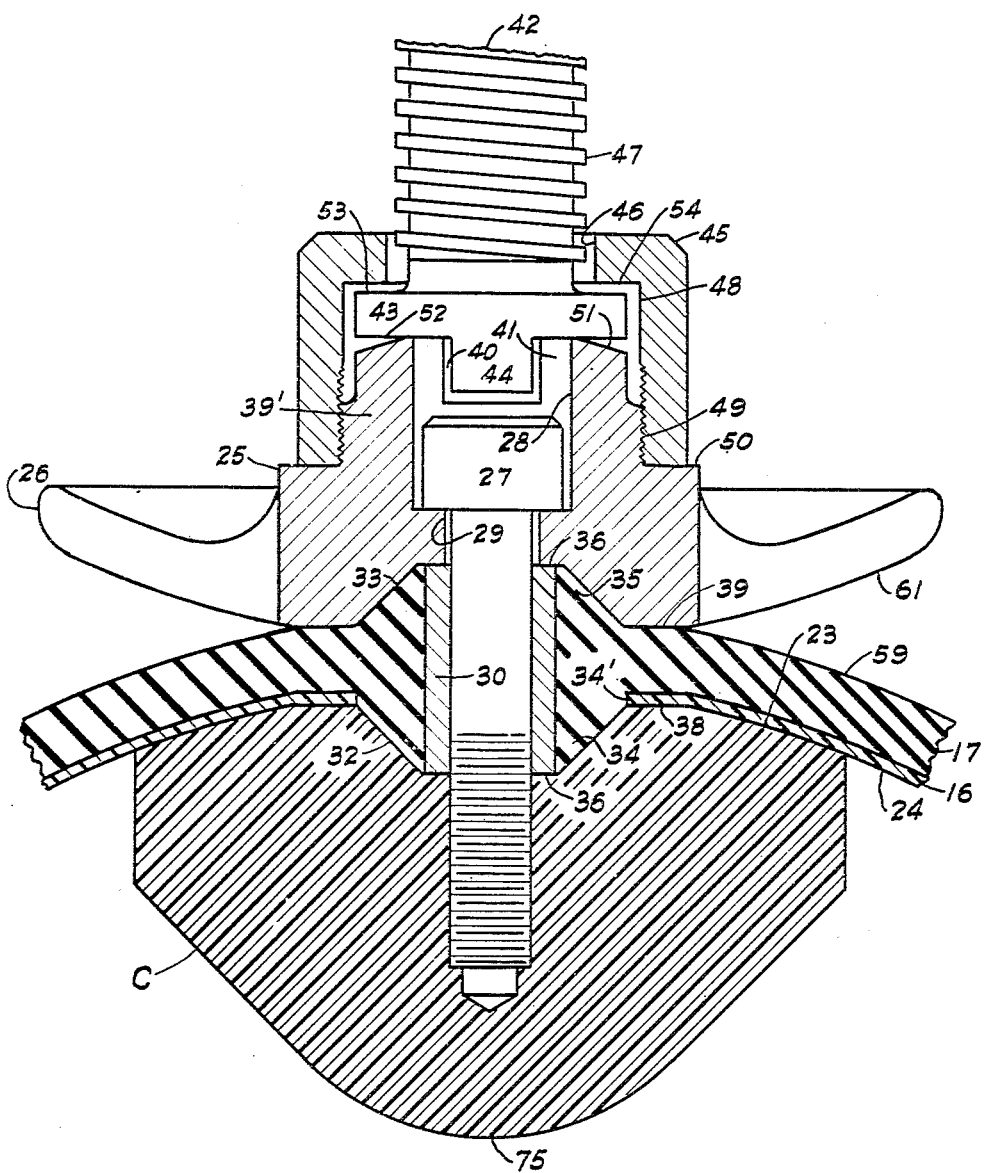
Figure 6 is an enlarged, longitudinal, fragmentary cross-section of the movable components to show more clearly a modified method of anchoring the protective shield into the lower joint of the coaxial union and to show a modified type of solid valve member.

Referring more particularly to Figures 5 and 6, it will be seen that the valve member C and follower plate 26 are formed to provide female cavities 32 and 33, respectively, and the screw 27 operates to lock oppositely projecting coaxial male components 34 and 35 of the diaphragm 17 therein annularly surrounding the compression-limiting metal sleeve 30 to form a coaxially opposed double union joint concentric with the assembled combination of movable components comprising the vital working elements of the valve. The compression-limiting sleeve 30 freely surrounds the body of the screw 27 in this central union joint area so that this screw can be rotated in the sleeve. The female cavities 32 and 33 of the valve member and follower plate respectively, are designed with annular horizontal faces or lands 36 corresponding substantially to the outside diameter of the compression-limiting sleeve 30 to prevent the diaphragm and shield from being injuriously compressed but ensuring a perfect fluid seal of simple character and wherein the double union connection is fully protected by the constructional combination of the mating components thereby produced.

A unique feature of this design of double union joint rests in the fact that the entire combination of movable components, namely, the valve member C, shield 16, diaphragm 17 and follower plate 26, are assembled in direct compression and that rotary motion for the assembly of all four parts is eliminated, thus ensuring a natural setting of the plastic or elastomer material used in the shield, valve member and diaphragm.

It is apparent that a modified form of centrally opposed annular projections on the outer and inner surfaces of the diaphragm may be employed to form the male components of the central double union joint, however, the preferred form of annular male projections, cooperating with their adjacent mating cavities to ensure an efficient seal, is illustrated in conical or angularly tapered cross-section. Moreover, it will be readily appreciated that the rigid compression-limiting sleeve 30 may form an integral insert in a molded form of sealing diaphragm. However, the preferred method of the present invention is to assemble the sleeve 30 as a snug fitting but separate unit within the bore of the central axis of the annular diaphragm projections 34 and 35 so that the double union joint will readily find its seat in the receiving cavities 32 and 33 to effect a perfect fluid seal.

An important feature of the invention is embodied in the construction of the adjustable tapered clamping fit, best shown in Figure 5, provided by the inner central projection 34 of the diaphragm and the cavity 32 of the valve member to lock therebetween the dish-shaped perforated annular central connection 37 of the protective shield 16 to effect an efficient fluid seal. Thus the matching tapers in the connection provide a clamping means which is self-seating and which also facilitates preforming of stiff plastics or elastomers that would be impaired physically if formed at right angles. Therefore, the present invention produces a means of concentrically clamping the protective shield 16 which substantially reduces the possibility of fatigue and subsequent failure of the shield material in the region of its centrally clamped area.

It will be apparent that a modified construction for clamping the protective shield 16 could be employed, as shown in Figure 6, wherein the inner central projection 34 of the diaphragm 17 is formed with an annular collar 34' the diameter of which corresponds to the diameter of the central perforation of the shield 16, the collar 34' fitting snugly therein to centralize the protective shield during assembly. In this particular modified construction, the horizontal annular sealing surfaces 38 of the valve member and 39 of the follower plate are designed to provide bearing areas which surround the projections 34 and 35 of the diaphragm 17 to clamp therebetween the adjacent surfaces of the diaphragm 17 and shield 16 in their corresponding annular regions, upon tightening of the screw 27.

An important feature of the present invention is embodied in the construction of the universal coupling between the valve stem and follower plate as shown more clearly in Figures 5 and 6. The hub 25 of the follower plate 26 is extended outwardly or upwardly to form an integral ram 39' incorporating, at its outer extremity, the milled horizontal slot 40 separating two coupling jaws 41 to form therebetween the female half of the universal coupling. The operating stem 42 is preferably formed with a circular ram collar 43 at its base and projecting integrally therefrom is the male half 44 of the universal coupling which fits loosely into the female half or slot 40 of the coupling. The retaining cap 45 has a bore 46 to freely accommodate the major thread diameter 47 of the stem 42. The counterbore 48 of the retaining cap 45 provides clearance and encasement for the diameter of the ram collar 43. The counterbore 48 of the retaining cap 45 and the follower plate ram 39' respectively, are internally and externally threaded, to provide therebetween a simple but secure fastening means 49. The seat 50 of the follower plate hub 25 provides a rigid tightening gauge for the retaining cap 45 when assembled therewith. The outer surface 51 of the projecting ram 39' is preferably spherically formed to permit radial contact with the adjacent surface 52 of the ram collar 43 to move the entire sub-assembly adjustably towards the valve seat 22. The outer flat surface 53 of the ram collar 43 is adapted to abut against the internal, flat, annular surface 54 of the retaining cap 45 and serves to lift the entire sub-assembly away from the valve seat 22. It will be seen from the drawing that the width of the ram collar 43 is slightly less than the distance between surfaces 51 and 54.

In construction, the invention embodies the supporting vanes 55 designed to support the diaphragm 17 and shield 16 in the open position of the valve. The vanes 55 are integrally cast with the bonnet B and radially project from the inner surface of its wall 56 towards the universal coupling assembly to permit free travel of the latter therein, as clearly shown in Figures 1 and 2. The lower extremities 53 of the vanes are shaped to conform with, and support the outer surface 59 of the diaphragm 17 and the protective shield 16 (Figure 1) when in fully open position, thus forming a supporting cradle for the diaphragm and shield in this position of the valve. Moreover, when the valve is fully open, it will be clear that the diaphragm 17 and shield 16 remain firmly locked between the lower extremities 58 of the vanes 55 and the upper convex surface 23 of the valve member C, thereby avoiding any possibility of fluttering in the diaphragm and the shield due to pulsating pressure or inward collapse of the same due to vacuum conditions arising within the valve body.

Figure 4:
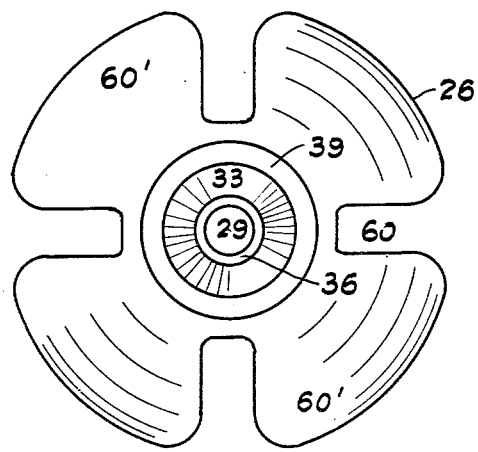
Figure 4 is a plan view of the inner convex surface of the follower plate to show its web-like construction and supporting area more clearly.
Figure 3:
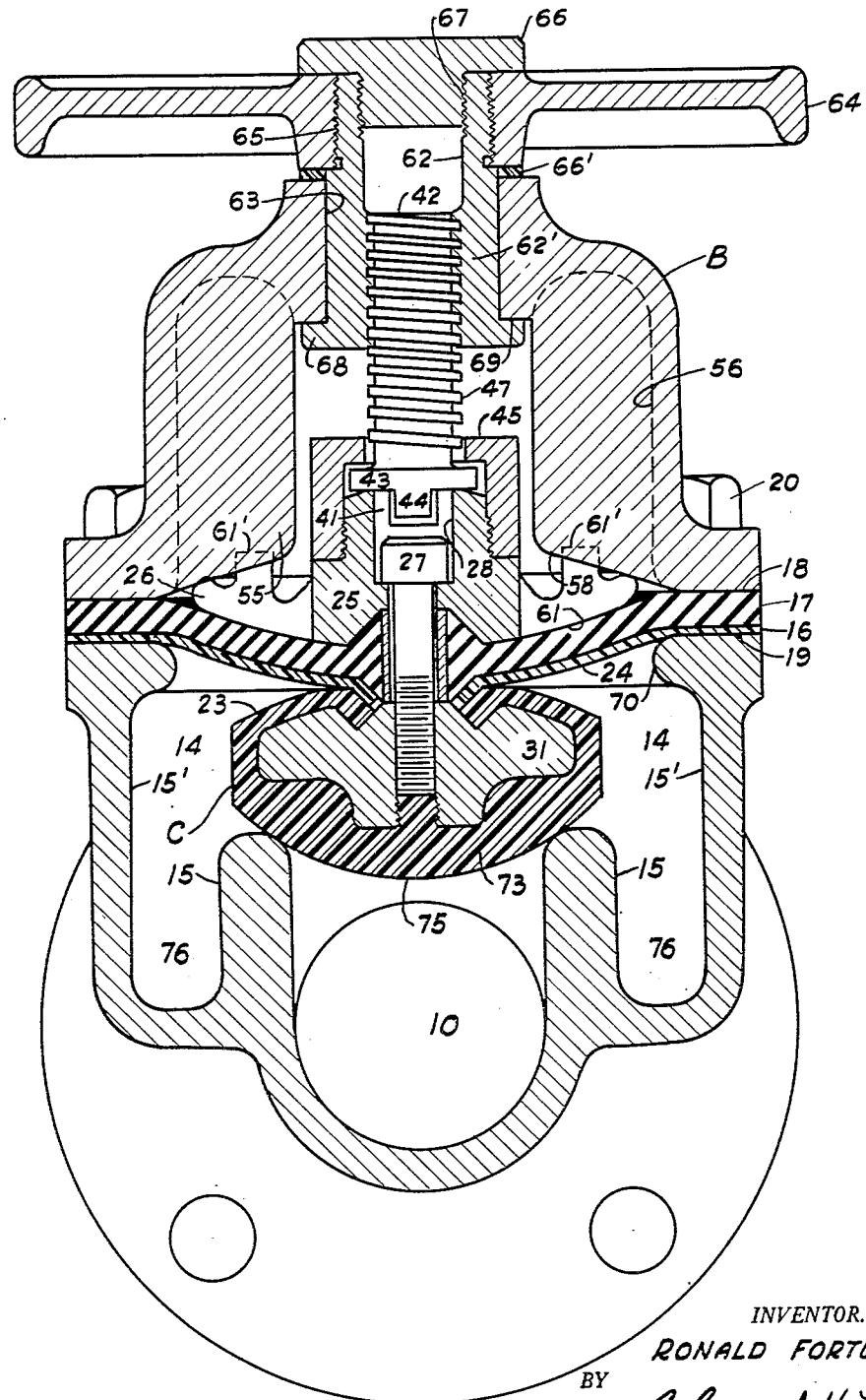
Figure 3 is a longitudinal cross-section taken along the line 3—3 of Figure 1 but with the valve member and cooperative moving components in the closed position.

The diaphragm and shield are protected against pressure from the inlet port 10 of the body A when the valve member C is seated in the closed position, and are supported against pressure during their movement to and from the closed position by means of the follower plate 26 which extends radially outward from the hub 25 to form a projection of generally circular periphery which is provided with slots 60 to form therebetween the segmental webs 60'. The surface 61 of the follower plate 26, adjacent diaphragm 17 is convex. As will be observed by reference to Figures 2 and 4, the slots 60 in the follower plate 26 are appropriately disposed to accommodate vanes 55. Thus on closing the valve against pressure, the convex surfaced follower plate 26, by reason of its outwardly radiating web-like construction, the area of which corresponds to the free flexing area of the diaphragm 17 and shield 16, provides an improved means of structural support for the diaphragm and shield during their inward and outward coordinating flexure, thus to prevent rupture and distortion of both and to extend their useful life. The inner surface 61 of the follower plate 26 is substantially convex, designed when the valve is in the fully closed position (Figure 3) to correspond with the concave outer surface 59 of the diaphragm and support it over its major free-flexing area. The diaphragm in turn supports the protective shield 16 to protect the latter when subject to back pressure from the outlet port 11 of the body A. The support vanes 55, in combination with the slots 60 of the follower plate 26, act to prevent rotation during movement of the latter as the valve is actuated from closed to open position and vice versa. Lugs 61' (Figures 2 and 3) project from the outer face of follower plate 26 to prevent rotation thereof in the event the peripheral edge of the follower plate travels inwardly beyond the inner or lower extremities 58 of vanes 55.

The threaded diameter 47 of the non-rotatable stem 42 fits with the internal thread of the bore 62 of the yoke sleeve 62', the latter being contained in the bore 63 of the bonnet B and extends beyond the top of the bonnet for fixed attachment with the handwheel 64 preferably by the threaded fit 65. Preferably also the yoke sleeve 62' and handwheel 64 are maintained in assembled relation by the locking plug 66 which has an internally screwed fit 67 in the bore 62 of the yoke sleeve. An annular corrosion resisting washer 66' is mounted around sleeve 62' immediately under handwheel 64. Rotation of the handwheel 64 transmits rotational motion to the yoke sleeve 62', thus translational motion is transmitted to the screw stem 42 causing the assembly of universally coupled components to move towards or away from the orifice 13 of the valve body A, while the interlocking female jaws 41 and male jaw 44 of the universal coupling prevent rotation of the stem 42. When the valve is open, the resulting thrust caused by pressure upon the inner surface 24 of the protective shield 16 is transmitted through the diaphragm 17, to the follower plate 26 and subsequently to the ram collar 43. Ultimate thrust is taken by the circular base 68 of the yoke sleeve 62' which abuts against the internal surface 69 of the bonnet shroud.

It will be appreciated that modifications of the stem 42 could be employed wherein the same is required to be actuated by pneumatic, mechanical or electrical solenoid means, in which case the handwheel may be removed and the stem 42 made in the form of an extended plain rod for actuation thereby. Moreover, the yoke sleeve 62' may be of the stationary type fixed in the bore 63 of the bonnet to accommodate an extended rotatable type screw stem to which the handwheel may be securely fastened. For the latter type of rotating stem, the ram head 39' of the follower plate is constructed without the slot 40 and male jaw 44 permitting the thrust collar 43 to engage in rotatable bearing contact with the spherically shaped surface 51 of the ram head 39'.

Means for reducing the effort required to close the valve against pressure is provided by the inwardly projecting annular ring or flange 70 (Figures 1 and 3) of the valve body A which overhangs the chamber 14 and subtends the inner surface 24 of the protective shield 16. In addition, the inwardly directed annular flange 70 permits of a contracted internal diameter of the bonnet wall 56, thus to reduce the free flexing area of both the diaphragm 17 and the protecting shield 16 exposed to fluid pressure, thereby to decrease the load on the diaphragm and to reduce the torque required to close the valve, in direct proportion to the greater area defined by the chamber wall 15' to the lesser area defined by the inwardly directed annular flange 70. In larger sizes of valves, this annular flange is directed inwardly to greater extent and the pressure reduction greatly amplified. Moreover, by locating a substantial portion of the clamping surfaces 19 and 18 respectively, of the body and bonnet flanges inwardly of the chamber wall 15', the construction provides greater clamping area for the outer margins of the diaphragm 17 and protective shield 16, thus producing an improved seal particularly between the inner surface 24 of the non-resilient material of the protective shield 16 and the surface 19. Furthermore, the construction facilitates production of a body, particularly in larger sizes of valves, with a shorter overall length between face to face of pipe flanges, without impairing the volumetric efficiency of the valve.

The valve member C comprises a rigid core 31 of metal, such as brass or magnesium or aluminum alloy, which is enveloped by a cover 73 of impervious material to isolate the rigid core 31 from the fluid and to render it immune to attack by corrosive solutions. As shown in Figure 5, the covering material terminates within the cavity 72 of the rigid core 31 providing an anchor for the cover 73 at the central axis of the valve member C when in assembled relation with the coaxially clamped components.

As disclosed and claimed in my prior United States application Serial No. 124,357, filed October 29, 1949, now Patent No. 2,638,309 of May 12, 1953, the rigid core 31 preferably embodies a plurality of anchorage holes 74 for extruding thereinto the covering material 73 during the molding process, thus providing a mechanically tenacious bond between the upper portion 23 and lower portion 75 of the covering 73. This construction avoids the necessity of cementing of the covering to the rigid insert or core when constructed as shown in Figure 5 and the attendant failure in service in the event the temperature of the fluid passing through the valve exceeds the critical softening point of the cement. It will be appreciated that, in a limited range of services, neoprene compounded rubbers, and also a variety of elastomers, may be employed in services varying between 150 to 200 degrees Fahrenheit. However, the present invention, by using recently developed plastics, may be safely employed in a much broader range of temperature up to 400 degrees Fahrenheit. In this connection, the rigid core 31 may be incorporated in a compression mold and covered with a high temperature thermo-plastic, such as a polymer of trifluorochloroethylene (known under the name Kel-F) which is one of the very few plastics presently available in granular form for commercial use and which retains its physical characteristics when subject to organic fluids at elevated temperatures and remains substantially stable under normal compressive force. Another highly resistant plastic now available for commercial use in the form of calendered sheets and extruded rods is polytetrafluoroethylene (known under the name Teflon). This latter substance has exceptional physical qualities, is completely insoluble in, and unswollen by all known organic solvents, and has great resistance to heat. For extremely hazardous solutions ranging from sub-zero to 400 degrees Fahrenheit, the present invention provides a construction which makes possible the practical adaptation and efficient and economical application of such peculiar materials in a valve of this class. It will be appreciated that the protective shield 16 may be economically preformed from the calendered sheet of inert polymerized plastic and assembled into the valve as shown in the preferred construction, Figure 5, or in alternative construction, Figure 6. The valve member C may alternatively be molded or otherwise formed in one solid piece from corrosion resistant plastic as shown in Figure 6, thus permitting use of the valve in a still wider range of service than heretofore. Both Kel-F and Teflon are sufficiently hard to permit machining.

In the open position, the lower spherical surface 75 of the valve member C converges concentrically toward the circular orifice 13, thus to serve as a diffuser for the impinging fluid from the orifice and to minimize erosion of the interior parts of the valve and afford added protection to the inner surface 24 of the shield 16 by effecting a quiescent annular distribution of the impinging fluid throughout the chamber 14 and into the downwardly inclined self-draining spillway 76 to converge into a smooth confluent stream at the outlet port 11.

Figure 9:
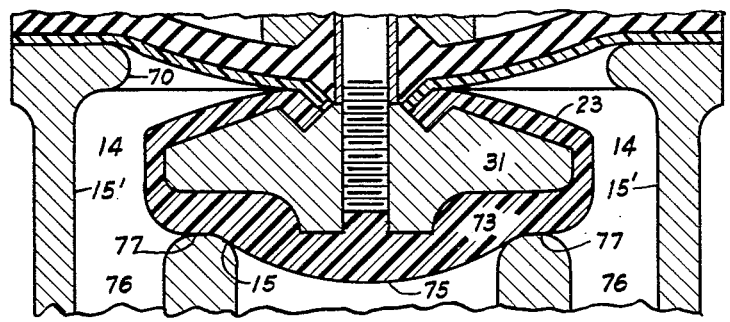
Figure 9 is a fragmentary, longitudinal cross-section showing a modified form of valve member to effect greater surface bearing with the seat of the central orifice of the valve body.

A further modification of the valve member C is shown in Figure 9. The diameter of the valve member is increased to provide an annular flat surface 77 which blends smoothly with the lower spherical contour 75 of the valve member. This modified lower surface follows the contour of the nozzle 15, mating therewith to provide greater contact area between the valve member and the valve seat for application in higher pressures.

As disclosed and claimed in my United States Application Serial No. 124,357, now Patent No. 2,638,309 of May 12, 1953, the valve member may vary in depth or thickness but has substantially identical contour on its upper and lower surfaces for supporting the inner surface 24 of the protective shield 16 and for seating with the seat 22 of the orifice 13 of the body A, respectively, and to maintain a concentrically secure union joint.

Figure 7:
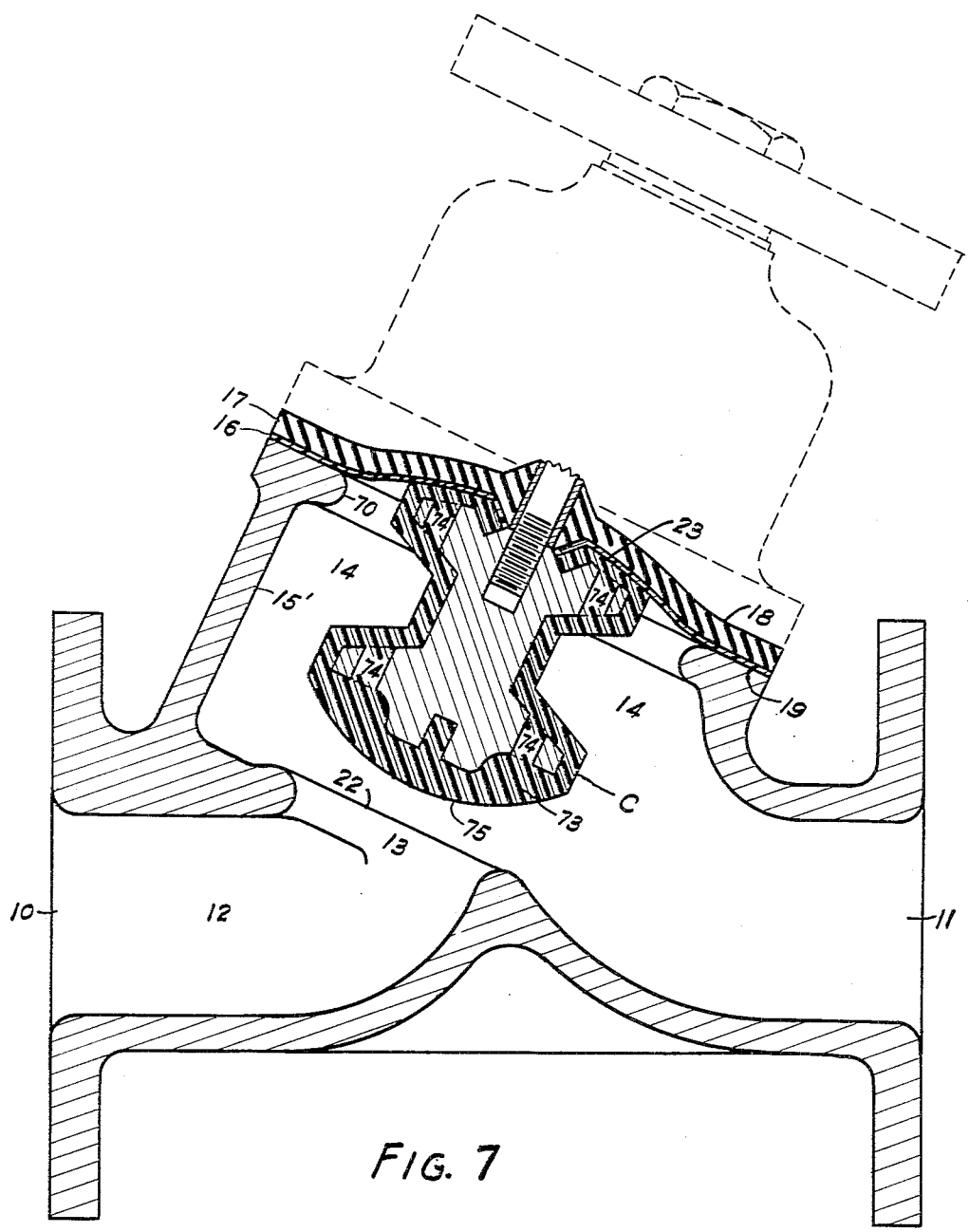
Figure 7 is a longitudinal section taken through the valve structure of the present invention, taken along the central longitudinal axis thereof, showing a modified type of Y body and valve member.
Figure 8:
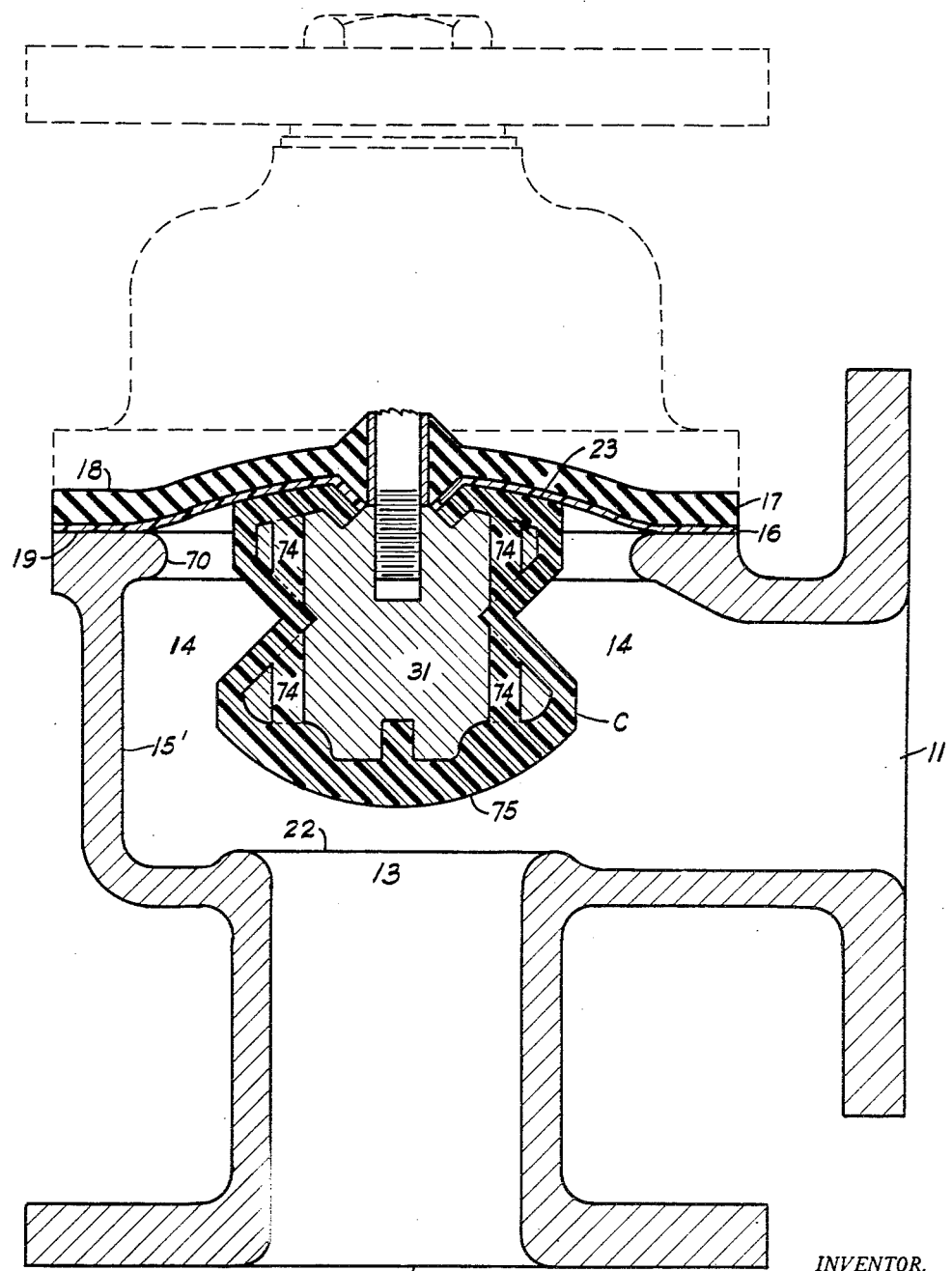
Figure 8 is a longitudinal section taken through the valve structure of the present invention, taken along the central longitudinal axis thereof, showing a further modified type of angle body and valve member.

To accommodate the increased depth of chamber 14 of the body A as modified for construction of the Y valve (Figure 7) and angle valve (Figure 8), the valve member is respectively modified to suit the depth or distance necessary to operate with the orifice 13. It will be observed that the basic design of the upper supporting contour 23 and lower diffusing contour 75 of the valve member remain substantially identical. The interchangeable valve members differ only in the elongated portion intermediate the peripheral edges of the upper and lower surfaces of the valve member. Thus, a combination of interchangeable components may be rapidly assembled to provide a straight valve as in Figure 1, a Y type valve as in Figure 7 and an angle type valve as in Figure 8, the construction providing interchangeability of all components required in the assembly of each class of valves of like capacity or size, as the companion flanges 18 and 19 of the bonnet and body respectively, are matched for a fit with each class of body within the same capacity and size of valve.

From the foregoing, it will be appreciated that I have produced an improved diaphragm valve structure employing a flexible protective shield covering the entire inner surface of the diaphragm which would otherwise be exposed to fluids. As a result thereof, the diaphragm functions mainly as a physical supporting member for the protective shield. A construction which opens new fields of application for this class of valve as the reinforcing diaphragm may now be made from a wide range of amenable materials incorporating conventional reinforcements or heat resisting substances reinforced by fibre glass, yet remains fully protected by the inert protective shield which may also be produced from a metallic sheet, such as Monel, Inconel or beryllium, titanium and their alloys, thus to greatly improve the practical applications in service and to extend the useful life of the valve. When using Kel-F or Teflon as a protective shield, the thickness of the shield should be approximately $\frac{1}{32}$ to $\frac{3}{32}$ inch thick, depending on the size of the valve. Shields of this thickness have sufficient strength to withstand rupture from constant flexing and have sufficient flexibility to bend without undue stress during opening and closing of the valve. The shield is preferably molded in the shape shown in Figure 1, i. e., an annular flat section joined to an intermediate inverted saucer-shaped section and a central inclined section. As is apparent from the drawings, the diaphragm may be several times the thickness of the shield. Ordinarily, such diaphragms are made by molding together alternate layers of natural or synthetic rubber and fabric, such as cotton duck, to a thickness of about $\frac{1}{8}$ to $\frac{3}{8}$ inch depending on whether the diaphragm is to be used in a smaller or larger valve.

The simple, but practical, construction incorporated to produce an efficient fluid seal between the valve member and follower plate, between which the diaphragm and shield are locked, maintains a rigid union that is protected against undue compression and injurious torsional forces. Moreover, the construction wherein the diaphragm and shield are adapted to flex independently of each other over their free-flexing areas permits of coordinated, yet compensating flexural movement between the adjacent free-flexing surfaces of the diaphragm and protective shield. By combining a conventional resilient diaphragm as a support for a shield made of material highly resistant to corrosion, but which is too stiff and lacking in resilience to be used in thicknesses which would be necessary if used alone as a diaphragm, I am able to reduce the shield to a thickness at which it will have the necessary flexibility required.

Finally, the improved universal coupling means between the stem and follower plate provides a construction which increases the structural quality between these elements and acts to transmit compensating radial alignment to the assembly of movable components during travel of the latter toward and away from the fluid control orifice and permits rapid assembly or disassembly of the stem without disturbing the double union seal, thus to further increase the practical efficiency of the valve.

Some variations, of course, could be made within the principle of the invention and it will, therefore, be understood the foregoing disclosure should not be construed in a sense more limiting than the scope of the appended claims.

What I claim is:

1. In a diaphragm valve having a bonnet and a body with a diaphragm composed of reinforced elastomer clamped therebetween, a valve member between said diaphragm and an orifice in said valve body, and means for moving said diaphragm and valve member toward and away from said orifice, the improvement comprising a thin, fluid impervious protective shield, thinner than said diaphragm, having a flat annular outer section joined to an intermediate shallow saucer-shaped section and being premolded to conform to the shape of the diaphragm, clamped at its edges between said body and diaphragm, said diaphragm having a central opening surrounded by an annular projection and said shield and valve member having central portions with a configuration corresponding to said projection, said shield being clamped at its center portion between said projection and central portion of said valve member in fluid tight relationship therewith by means of a fastening means mounted from the bonnet side of the valve and passing through the center of said diaphragm and shield into a recess in said valve member whereby said fastening means is not exposed on the body side of said valve, said shield and said diaphragm being capable of being flexed to open and closed positions in operative coordination, said shield being composed of synthetic plastic material more resistant to corrosive fluids than said diaphragm, but of lesser resilience and greater stiffness than said diaphragm, said diaphragm and said shield being separate and independent of each other.

2. A diaphragm valve in accordance with claim 1 in which the diaphragm is composed of a substance selected from the group consisting of reinforced natural and synthetic rubber and the shield is composed of a substance selected from the group consisting of trifluorochloroethylene polymer and polytetrafluoroethylene.

3. A diaphragm valve in accordance with claim 1 in which said projection is of gradually reduced circumference in the direction of its outer end, said valve member has a horizontal annular bearing area immediately surrounding said projection, and the fastening means is a screw threaded into a threaded recess in said valve member.

4. A diaphragm valve in accordance with claim 3 in which the valve element has a surface of corrosion resistant synthetic plastic and is adapted to cooperate with said orifice to open and close it.

5. In a diaphragm valve having a bonnet and a body with a diaphragm composed of reinforced elastomer clamped therebetween, a valve member between said diaphragm and an orifice in said valve body, and means for moving said diaphragm and valve member toward and away from said orifice, the improvement comprising a thin, fluid impervious protective shield, thinner than said diaphragm, having a flat annular outer section joined to an intermediate shallow saucer-shaped section and being premolded to conform generally to the shape of said diaphragm, clamped at its edges between said body and diaphragm, said diaphragm having a central opening surrounded by an annular projection and said valve member having a central portion with a configuration mating with that of the annular projection of the diaphragm, said shield being clamped at its center portion between said diaphragm and valve member in fluid tight relationship therewith by means of a fastening means mounted from the bonnet side of the valve and passing through the center of said diaphragm and shield into a recess in said valve member whereby said fastening means is not exposed on the body side of said valve, said shield and said diaphragm being capable of being flexed to open and closed positions in operative coordination, said shield being composed of synthetic plastic material more resistant to corrosive fluids than said diaphragm, but of lesser resilience and greater stiffness than said diaphragm, said diaphragm and said shield being separate and independent of each other.

References Cited in the file of this patent

UNITED STATES PATENTS

| | | |
|---|---|---|
| 1,146,622 | Hill | July 13, 1915 |
| 1,470,352 | Dubbs | Oct. 9, 1923 |
| 1,647,823 | Antisell | Nov. 1, 1927 |
| 1,662,291 | Bastian | Mar. 13, 1928 |
| 1,779,503 | Swindin | Oct. 28, 1930 |
| 1,802,136 | Carter | Apr. 21, 1931 |
| 1,923,306 | Hagen | Aug. 22, 1933 |
| 1,983,106 | Sundstrom | Dec. 4, 1934 |
| 1,991,621 | Noll | Feb. 19, 1935 |
| 2,059,111 | Joyce | Oct. 27, 1936 |
| 2,087,621 | Lorraine | July 20, 1937 |
| 2,238,387 | Friedel | Apr. 15, 1941 |
| 2,323,531 | Franck | July 6, 1943 |
| 2,394,243 | Joyce | Feb. 5, 1946 |
| 2,416,061 | McAlevy | Feb. 18, 1947 |
| 2,459,721 | Poltorak | Jan. 18, 1949 |
| 2,654,559 | Franck | Oct. 6, 1953 |

FOREIGN PATENTS

| | | |
|---|---|---|
| 704,479 | France | Feb. 23, 1931 |